US009652765B2

(12) United States Patent
Antoo et al.

(10) Patent No.: US 9,652,765 B2
(45) Date of Patent: *May 16, 2017

(54) SYSTEM AND METHOD FOR IMPLEMENTING FINANCIAL ASSISTANCE PROGRAMS

(71) Applicant: Visa U.S.A. Inc., San Francisco, CA (US)

(72) Inventors: Nizam Antoo, San Carlos, CA (US); Todd J Brockman, Kentfield, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/865,639

(22) Filed: Apr. 18, 2013

(65) Prior Publication Data

US 2013/0232081 A1    Sep. 5, 2013

Related U.S. Application Data

(63) Continuation of application No. 12/229,760, filed on Aug. 26, 2008, now Pat. No. 8,447,669.

(51) Int. Cl.
*G06Q 40/00* (2012.01)
*G06Q 20/38* (2012.01)
(Continued)

(52) U.S. Cl.
CPC ............ *G06Q 20/38* (2013.01); *G06Q 20/10* (2013.01); *G06Q 20/20* (2013.01); *G06Q 20/387* (2013.01); *G06Q 50/26* (2013.01)

(58) Field of Classification Search
CPC ......... G06Q 20/00; G06Q 30/00; G06Q 40/00
(Continued)

(56) References Cited

U.S. PATENT DOCUMENTS 789,106 A     5/1905   Seymour
5,237,164 A   8/1993   Takada
(Continued)

FOREIGN PATENT DOCUMENTS

EP   0855659       11/2007
JP   08-545210     12/2008
(Continued)

OTHER PUBLICATIONS

David Breitkopf, "ACS to Take Over Mich. WC Distribution Program", American Banker, New York, NY: Jul. 20, 2006, vol. 171. Issue 138, p. 6.
(Continued)

*Primary Examiner* — Frantzy Poinvil
(74) *Attorney, Agent, or Firm* — Loeb & Loeb LLP

(57) ABSTRACT

A system and method to provide food stamp benefits to recipients. The state agency responsible for distributing food stamp benefits to eligible recipients employs an issuer to produce consumer access devices for distribution to the recipients. The consumer access device is encoded with information enabling the food stamp recipients to purchase specified items from merchants. By imprinting the consumer access device with indicia identifying a commercial payment processing network and employing the commercial payment processing network to process the transactions, transaction funded by the food stamp program will appear to be credit or debit transactions personally funded by the food stamp recipient.

18 Claims, 3 Drawing Sheets

(51) Int. Cl.
  *G06Q 20/10* (2012.01)
  *G06Q 20/20* (2012.01)
  *G06Q 50/26* (2012.01)
(58) Field of Classification Search
  USPC .............................................. 705/4–44, 3–44
  See application file for complete search history.

(56) References Cited

U.S. PATENT DOCUMENTS

| | | | |
|---|---|---|---|
| 5,311,594 A | 5/1994 | Penzias | |
| 5,446,890 A | 8/1995 | Renslo et al. | |
| 5,459,656 A | 10/1995 | Fields et al. | |
| 5,510,777 A | 4/1996 | Pilc et al. | |
| 5,521,362 A | 5/1996 | Powers | |
| 5,530,438 A | 6/1996 | Bickham et al. | |
| 5,536,045 A | 7/1996 | Adams | |
| 5,615,110 A | 3/1997 | Wong | |
| 5,615,264 A | 3/1997 | Kazmierczak et al. | |
| 5,649,118 A | 7/1997 | Carlisle et al. | |
| 5,815,657 A | 9/1998 | Williams et al. | |
| 5,850,446 A | 12/1998 | Berger et al. | |
| 5,878,337 A | 3/1999 | Joao et al. | |
| 5,903,830 A | 5/1999 | Joao et al. | |
| 5,943,624 A | 8/1999 | Fox et al. | |
| 5,963,924 A | 10/1999 | Williams et al. | |
| 6,064,990 A | 5/2000 | Goldsmith | |
| 6,092,053 A | 7/2000 | Boesch et al. | |
| 6,202,052 B1 | 3/2001 | Miller | |
| 6,202,933 B1 | 3/2001 | Poore et al. | |
| 6,263,447 B1 | 7/2001 | French et al. | |
| 6,267,292 B1 | 7/2001 | Walker et al. | |
| 6,336,099 B1 | 1/2002 | Barnett et al. | |
| 6,473,500 B1 | 10/2002 | Risafi et al. | |
| 6,529,725 B1 | 3/2003 | Joao et al. | |
| 6,535,855 B1 | 3/2003 | Cahill et al. | |
| 6,601,761 B1 | 8/2003 | Katis | |
| 6,735,572 B2 | 5/2004 | Landesmann | |
| 6,853,982 B2 | 2/2005 | Smith et al. | |
| 6,857,073 B2 | 2/2005 | French et al. | |
| 6,873,974 B1 | 3/2005 | Schutzer | |
| 6,898,598 B2 | 5/2005 | Himmel et al. | |
| 6,934,528 B2 | 8/2005 | Loureiro et al. | |
| 6,999,943 B1 | 2/2006 | Johnson et al. | |
| 7,024,383 B1 | 4/2006 | Mancini et al. | |
| 7,028,052 B2 | 4/2006 | Chapman et al. | |
| 7,047,041 B2 | 5/2006 | Vanska et al. | |
| 7,051,002 B2 | 5/2006 | Keresman, III et al. | |
| 7,089,208 B1 | 8/2006 | Levchin et al. | |
| 7,096,003 B2 | 8/2006 | Joao et al. | |
| 7,111,789 B2 | 9/2006 | Rajasekaran et al. | |
| 7,155,411 B1 | 12/2006 | Blinn et al. | |
| 7,177,848 B2 | 2/2007 | Hogan et al. | |
| 7,194,437 B1 | 3/2007 | Britto et al. | |
| 7,206,847 B1 | 4/2007 | Alberth et al. | |
| 7,212,979 B1 | 5/2007 | Matz et al | |
| RE39,736 E | 7/2007 | Morrill, Jr. | |
| 7,268,667 B2 | 9/2007 | Beenau et al. | |
| 7,268,668 B2 | 9/2007 | Beenau et al. | |
| 7,290,704 B1 | 11/2007 | Ball et al. | |
| 7,318,049 B2 | 1/2008 | Iannacci | |
| 7,337,119 B1 | 2/2008 | Geschwender et al. | |
| 7,337,144 B1 | 2/2008 | Blinn et al. | |
| 7,343,149 B2 | 3/2008 | Benco et al. | |
| 7,343,351 B1 | 3/2008 | Bishop et al. | |
| 7,349,885 B2 | 3/2008 | Gangi | |
| 7,356,505 B2 | 4/2008 | March | |
| 7,357,310 B2 | 4/2008 | Calabrese et al. | |
| 7,359,880 B2 | 4/2008 | Abel et al. | |
| 7,373,669 B2 | 5/2008 | Eisen et al. | |
| 7,379,899 B1 | 5/2008 | Junger | |
| 7,392,222 B1 | 6/2008 | Hamilton et al. | |
| 7,395,242 B2 | 7/2008 | Blinn et al. | |
| 7,398,250 B2 | 7/2008 | Blinn et al. | |
| 7,413,113 B1 | 8/2008 | Zhu | |
| 7,450,966 B2 | 11/2008 | Vanska et al. | |
| 7,477,780 B2 | 1/2009 | Boncyk et al. | |
| 7,499,889 B2 | 3/2009 | Golan et al. | |
| 7,500,607 B2 | 3/2009 | Williams | |
| 7,533,064 B1 | 5/2009 | Boesch | |
| 7,536,360 B2 | 5/2009 | Stolfo et al. | |
| 7,571,139 B1 | 8/2009 | Giordano et al. | |
| 7,571,140 B2 | 8/2009 | Weichert et al. | |
| 7,593,858 B2 | 9/2009 | Matz et al. | |
| 7,603,311 B1 | 10/2009 | Yadav-Ranjan | |
| 7,630,937 B1 | 12/2009 | Mo et al. | |
| 7,634,295 B2 | 12/2009 | Hayaashi et al. | |
| 7,644,037 B1 | 1/2010 | Ostrovsky | |
| 7,644,859 B1 | 1/2010 | Zhu | |
| 7,660,749 B2 | 2/2010 | Koski | |
| 7,676,434 B2 | 3/2010 | Evans | |
| 7,685,067 B1 | 3/2010 | Britto et al. | |
| 7,698,221 B2 | 4/2010 | Blinn et al. | |
| 7,707,113 B1 | 4/2010 | Dimartino et al. | |
| 7,708,194 B2 | 5/2010 | Vawter | |
| 7,708,198 B2 | 5/2010 | Gangi | |
| 7,712,658 B2 | 5/2010 | Gangi | |
| 7,739,194 B2 | 6/2010 | Blinn et al. | |
| 7,742,984 B2 | 6/2010 | Mohsenzadeh | |
| 7,774,076 B2 | 8/2010 | Skowronek | |
| 7,783,569 B2 | 8/2010 | Abel et al. | |
| 7,784,684 B2 | 8/2010 | Labrou et al. | |
| 7,801,829 B2 | 9/2010 | Gray et al. | |
| 7,802,719 B2 | 9/2010 | Johnson et al. | |
| 7,810,720 B2 | 10/2010 | Lovett | |
| 7,819,307 B2 | 10/2010 | Lyons et al. | |
| 7,828,206 B2 | 11/2010 | Hessburg et al. | |
| 7,828,992 B2 | 11/2010 | Kilickiran et al. | |
| 7,837,125 B2 | 11/2010 | Biskupski | |
| 7,844,530 B2 | 11/2010 | Ziade et al. | |
| 7,849,014 B2 | 12/2010 | Erikson | |
| 7,870,027 B1 | 1/2011 | Tannenbaum | |
| 7,877,299 B2 | 1/2011 | Bui | |
| 7,878,400 B2 | 2/2011 | Harris | |
| 7,890,370 B2 | 2/2011 | Whitsitt et al. | |
| 7,895,119 B2 | 2/2011 | Praisner | |
| 7,899,744 B2 | 3/2011 | Bishop et al. | |
| 7,904,360 B2 | 3/2011 | Evans | |
| 7,908,227 B2 | 3/2011 | Zissimopoulos et al. | |
| 7,926,714 B1 | 4/2011 | Zhu | |
| 7,933,779 B2 | 4/2011 | Rooks et al. | |
| 7,941,367 B2 * | 5/2011 | Bishop et al. | 705/38 |
| 7,942,337 B2 | 5/2011 | Jain | |
| 7,962,418 B1 | 6/2011 | Wei et al. | |
| 7,967,196 B1 | 6/2011 | Bierbaum et al. | |
| 7,971,782 B1 | 7/2011 | Shams | |
| 7,979,349 B2 * | 7/2011 | Bishop et al. | 705/39 |
| 7,996,259 B1 | 8/2011 | Distefano, III | |
| 8,016,192 B2 | 9/2011 | Messerges et al. | |
| 8,020,763 B1 | 9/2011 | Kowalchyk et al. | |
| 8,024,260 B1 | 9/2011 | Hogl et al. | |
| 8,028,041 B2 | 9/2011 | Olliphant et al. | |
| 8,032,438 B1 | 10/2011 | Barton et al. | |
| 8,041,338 B2 | 10/2011 | Chen et al. | |
| 8,050,997 B1 | 11/2011 | Nosek et al. | |
| 8,060,413 B2 | 11/2011 | Castell et al. | |
| 8,074,876 B2 | 12/2011 | Foss et al. | |
| 8,108,261 B2 | 1/2012 | Carlier et al. | |
| 8,127,982 B1 | 3/2012 | Casey et al. | |
| 8,140,418 B1 | 3/2012 | Casey et al. | |
| 8,145,188 B2 | 3/2012 | Park et al. | |
| 8,145,561 B1 | 3/2012 | Zhu et al. | |
| 8,145,566 B1 | 3/2012 | Ahuja et al. | |
| 8,145,569 B2 | 3/2012 | Gong | |
| 8,145,898 B2 | 3/2012 | Kamalakantha | |
| 8,150,767 B2 | 4/2012 | Wankmueller | |
| 8,150,772 B2 | 4/2012 | Mardikar et al. | |
| 8,151,328 B1 | 4/2012 | Lundy | |
| 8,151,330 B2 | 4/2012 | Vishik et al. | |
| 8,151,336 B2 | 4/2012 | Savoor | |
| 8,155,999 B2 | 4/2012 | De Boer et al. | |
| 8,156,000 B1 | 4/2012 | Thompson | |
| 8,156,026 B2 | 4/2012 | Junger et al. | |
| 8,156,042 B2 | 4/2012 | Winkelman, III et al. | |
| 8,156,549 B2 | 4/2012 | Rice et al. | |

(56) References Cited

U.S. PATENT DOCUMENTS

| | | |
|---|---|---|
| 8,157,178 B2 | 4/2012 | Dewan et al. |
| 8,157,181 B2 | 4/2012 | Bates et al. |
| 8,160,935 B2 | 4/2012 | Bui |
| 8,160,959 B2 | 4/2012 | Rackley, III et al. |
| 8,165,961 B1 | 4/2012 | Dimartino et al. |
| 8,166,068 B2 | 4/2012 | Stevens |
| RE43,351 E | 5/2012 | Jordan, Jr. |
| 8,170,921 B2 | 5/2012 | Stocker |
| 8,175,235 B2 | 5/2012 | Mumford et al. |
| 8,175,965 B2 | 5/2012 | Moore et al. |
| 8,175,967 B2 | 5/2012 | O'Leary et al. |
| 8,175,968 B2 | 5/2012 | O'Leary et al. |
| 8,175,975 B2 | 5/2012 | Cai et al. |
| 8,175,979 B2 | 5/2012 | Baentsch et al. |
| 8,176,416 B1 | 5/2012 | Williams et al. |
| 8,179,563 B2 | 5/2012 | King et al. |
| 8,180,289 B1 | 5/2012 | Glickman |
| 8,180,705 B2 | 5/2012 | Kowalchyk et al. |
| 8,190,513 B2 | 5/2012 | Felger |
| 8,191,775 B2 | 6/2012 | Hildred |
| 8,195,233 B2 | 6/2012 | Morikuni et al. |
| 8,195,544 B2 | 6/2012 | Horsfall |
| 8,195,547 B2 | 6/2012 | Aaltonen et al. |
| 8,195,565 B2 | 6/2012 | Bishop et al. |
| 8,195,576 B1 | 6/2012 | Grigg et al. |
| 8,196,131 B1 | 6/2012 | Von Behren et al. |
| 8,200,582 B1 | 6/2012 | Zhu |
| 8,204,774 B2 | 6/2012 | Chwast et al. |
| 8,204,829 B2 | 6/2012 | Alvarez et al. |
| 8,209,245 B2 | 6/2012 | Dennes |
| 8,209,744 B2 | 6/2012 | Zhu et al. |
| 8,214,288 B2 | 7/2012 | Olliphant et al. |
| 8,214,289 B2 | 7/2012 | Scipioni |
| 8,214,291 B2 | 7/2012 | Pelegero et al. |
| 8,214,292 B2 | 7/2012 | Duggal et al. |
| 8,214,293 B2 | 7/2012 | Powell |
| 8,214,886 B2 | 7/2012 | Foley et al. |
| 8,215,546 B2 | 7/2012 | Lin et al. |
| 8,219,411 B2 | 7/2012 | Matz et al. |
| 8,219,474 B2 | 7/2012 | Sutton et al. |
| 8,219,490 B2 | 7/2012 | Hammad et al. |
| 8,220,047 B1 | 7/2012 | Soghoian et al. |
| 8,224,702 B2 | 7/2012 | Mengerink et al. |
| 8,224,754 B2 | 7/2012 | Pastusiak et al. |
| 8,224,773 B2 | 7/2012 | Spiegel |
| 8,225,997 B1 | 7/2012 | Bierbaum et al. |
| 8,227,936 B1 | 7/2012 | Folk et al. |
| 8,229,354 B2 | 7/2012 | Sklovsky et al. |
| 8,229,808 B1 | 7/2012 | Heit |
| 8,229,844 B2 | 7/2012 | Felger |
| 8,229,851 B2 | 7/2012 | Doran et al. |
| 8,229,854 B2 | 7/2012 | Stephen et al. |
| 8,233,841 B2 | 7/2012 | Griffin et al. |
| 8,234,183 B2 | 7/2012 | Smith |
| 8,239,276 B2 | 8/2012 | Lin et al. |
| 8,244,580 B2 | 8/2012 | Mankoff et al. |
| 8,249,965 B2 | 8/2012 | Tumminaro |
| 8,255,278 B1 | 8/2012 | Young et al. |
| 8,255,323 B1 | 8/2012 | Casey et al. |
| 8,255,324 B2 | 8/2012 | Bercy et al. |
| 8,275,704 B2 * | 9/2012 | Bishop et al. ............... 705/39 |
| 8,280,777 B2 | 10/2012 | Mengerink et al. |
| 8,281,998 B2 | 10/2012 | Tang et al. |
| 8,282,002 B2 | 10/2012 | Shams |
| 8,285,640 B2 | 10/2012 | Scipioni |
| 8,285,820 B2 | 10/2012 | Olliphant et al. |
| 8,285,832 B2 | 10/2012 | Schwab et al. |
| 8,286,875 B2 | 10/2012 | Tang et al. |
| 8,290,433 B2 | 10/2012 | Fisher et al. |
| 8,290,819 B2 | 10/2012 | Bawcutt |
| 8,290,829 B1 | 10/2012 | Katz et al. |
| 8,295,898 B2 | 10/2012 | Ashfield et al. |
| 8,296,187 B2 | 10/2012 | Light et al. |
| 8,296,204 B2 | 10/2012 | Templeton et al. |
| 8,296,228 B1 | 10/2012 | Kloor |
| 8,296,231 B2 | 10/2012 | Britto et al. |
| 8,301,500 B2 | 10/2012 | Pharris |
| 8,301,510 B2 | 10/2012 | Boesch |
| 8,301,556 B2 | 10/2012 | Hogl et al. |
| 8,311,520 B2 | 11/2012 | Choi et al. |
| 8,312,096 B2 | 11/2012 | Cohen et al. |
| 8,321,267 B2 | 11/2012 | Hoerenz et al. |
| 8,321,294 B2 | 11/2012 | Carlier et al. |
| 8,321,315 B2 | 11/2012 | Abel et al. |
| 8,321,338 B2 | 11/2012 | Baumgart et al. |
| 8,321,343 B2 | 11/2012 | Ramavarjula et al. |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement et al. |
| 8,332,272 B2 | 12/2012 | Fisher |
| 8,332,275 B2 | 12/2012 | Poon et al. |
| 8,332,323 B2 | 12/2012 | Stals et al. |
| 8,335,720 B2 | 12/2012 | Juang et al. |
| 8,335,726 B1 | 12/2012 | Ling et al. |
| 8,335,822 B2 | 12/2012 | Ahmed et al. |
| 8,335,921 B2 | 12/2012 | Von Behren et al. |
| 8,335,932 B2 | 12/2012 | Von Behren et al. |
| 8,340,666 B2 | 12/2012 | Ramer et al. |
| 8,341,029 B1 | 12/2012 | Ramalingam et al. |
| 8,346,643 B2 | 1/2013 | Boyer et al. |
| 8,346,659 B1 | 1/2013 | Mohsenzadeh |
| 8,346,663 B2 | 1/2013 | Kawan |
| 8,352,323 B2 | 1/2013 | Fisher |
| 8,352,362 B2 | 1/2013 | Mohsenzadeh |
| 8,352,499 B2 | 1/2013 | Bharat et al. |
| 8,352,749 B2 | 1/2013 | Von Behren et al. |
| 8,355,987 B2 | 1/2013 | Hirson et al. |
| 8,359,070 B1 | 1/2013 | Zhu |
| 8,364,587 B2 | 1/2013 | Nuzum et al. |
| 8,364,590 B1 | 1/2013 | Casey et al. |
| 8,370,264 B1 | 2/2013 | Wei et al. |
| 8,380,177 B2 | 2/2013 | Laracey |
| 8,401,904 B1 | 3/2013 | Simakov et al. |
| 8,412,586 B1 | 4/2013 | Foulser et al. |
| 8,412,630 B2 | 4/2013 | Ross et al. |
| 8,417,633 B1 | 4/2013 | Chmara et al. |
| 8,423,462 B1 | 4/2013 | Amacker et al. |
| 8,458,086 B2 * | 6/2013 | Bishop et al. ............... 705/39 |
| 8,595,083 B2 * | 11/2013 | O'Leary et al. ............ 705/26.1 |
| 8,596,547 B2 * | 12/2013 | Diamond .................... 235/492 |
| 2001/0037297 A1 | 11/2001 | McNair |
| 2001/0056359 A1 | 12/2001 | Abreu |
| 2002/0040325 A1 | 4/2002 | Takae et al. |
| 2002/0077976 A1 | 6/2002 | Meyer et al. |
| 2002/0107755 A1 | 8/2002 | Steed et al. |
| 2002/0112014 A1 | 8/2002 | Bennett et al. |
| 2002/0116271 A1 | 8/2002 | Mankoff |
| 2002/0143614 A1 | 10/2002 | MacLean et al. |
| 2003/0014307 A1 | 1/2003 | Heng |
| 2003/0026404 A1 | 2/2003 | Joyce et al. |
| 2003/0028481 A1 | 2/2003 | Flitcroft et al. |
| 2003/0080185 A1 | 5/2003 | Werther |
| 2003/0097318 A1 | 5/2003 | Yu et al. |
| 2003/0101134 A1 | 5/2003 | Liu et al. |
| 2003/0174823 A1 | 9/2003 | Justice et al. |
| 2003/0177361 A1 | 9/2003 | Wheeler et al. |
| 2003/0191711 A1 | 10/2003 | Jamison et al. |
| 2003/0200142 A1 | 10/2003 | Hicks et al. |
| 2003/0200184 A1 | 10/2003 | Dominguez et al. |
| 2003/0212642 A1 | 11/2003 | Weller et al. |
| 2004/0078332 A1 | 4/2004 | Ferguson et al. |
| 2004/0103037 A1 | 5/2004 | Wetmore et al. |
| 2004/0128197 A1 | 7/2004 | Bam et al. |
| 2004/0138999 A1 | 7/2004 | Friedman et al. |
| 2004/0148255 A1 | 7/2004 | Beck et al. |
| 2004/0215963 A1 | 10/2004 | Kaplan |
| 2004/0230536 A1 | 11/2004 | Fung et al. |
| 2004/0236646 A1 | 11/2004 | Wu et al. |
| 2004/0254891 A1 | 12/2004 | Blinn et al. |
| 2004/0267608 A1 | 12/2004 | Mansfield, Jr. |
| 2005/0010483 A1 | 1/2005 | Ling |
| 2005/0037735 A1 | 2/2005 | Coutts |
| 2005/0065819 A1 | 3/2005 | Schultz |

(56) References Cited

U.S. PATENT DOCUMENTS

| | | |
|---|---|---|
| 2005/0080747 A1 | 4/2005 | Anderson et al. |
| 2005/0080821 A1 | 4/2005 | Breil et al. |
| 2005/0097320 A1 | 5/2005 | Golan et al. |
| 2005/0137969 A1 | 6/2005 | Shah |
| 2005/0171894 A1 | 8/2005 | Traynor |
| 2005/0192893 A1 | 9/2005 | Keeling et al. |
| 2005/0192895 A1 | 9/2005 | Rogers et al. |
| 2005/0220326 A1 | 10/2005 | Sim |
| 2005/0234817 A1 | 10/2005 | VanFleet et al. |
| 2005/0246278 A1 | 11/2005 | Gerber et al. |
| 2005/0254714 A1 | 11/2005 | Anne |
| 2005/0261967 A1 | 11/2005 | Barry et al. |
| 2006/0053056 A1 | 3/2006 | Alspach-goss et al. |
| 2006/0085328 A1 | 4/2006 | Cohen et al. |
| 2006/0085477 A1 | 4/2006 | Phillips et al. |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano et al. |
| 2006/0190347 A1 | 8/2006 | Cuervo |
| 2006/0226216 A1 | 10/2006 | Keithley |
| 2006/0277143 A1 | 12/2006 | Almonte et al. |
| 2006/0293947 A1 | 12/2006 | Nicholson |
| 2007/0011025 A1 | 1/2007 | Cracchiolo et al. |
| 2007/0038515 A1 | 2/2007 | Postrel |
| 2007/0038516 A1 | 2/2007 | Apple et al. |
| 2007/0055571 A1 | 3/2007 | Fox et al. |
| 2007/0087820 A1 | 4/2007 | Van Luchene et al. |
| 2007/0094066 A1 | 4/2007 | Kumar et al. |
| 2007/0100691 A1 | 5/2007 | Patterson |
| 2007/0100728 A1 | 5/2007 | Rotman et al. |
| 2007/0106607 A1 | 5/2007 | Seib et al. |
| 2007/0113289 A1 | 5/2007 | Blumenau |
| 2007/0143204 A1 | 6/2007 | Claus et al. |
| 2007/0150413 A1 | 6/2007 | Morgenstern |
| 2007/0180119 A1 | 8/2007 | Khivesara et al. |
| 2007/0208662 A1 | 9/2007 | Jeronimus et al. |
| 2007/0214078 A1 | 9/2007 | Coppinger |
| 2007/0214250 A1 | 9/2007 | Ahmed et al. |
| 2007/0226152 A1 | 9/2007 | Jones |
| 2007/0233590 A1 | 10/2007 | Hardison, III |
| 2007/0239502 A1 | 10/2007 | Babu |
| 2007/0276765 A1 | 11/2007 | Hazel et al. |
| 2008/0004116 A1 | 1/2008 | Van Luchene et al. |
| 2008/0004952 A1 | 1/2008 | Koli |
| 2008/0010096 A1 | 1/2008 | Patterson et al. |
| 2008/0021829 A1 | 1/2008 | Kranzley |
| 2008/0077489 A1 | 3/2008 | Gilley et al. |
| 2008/0086365 A1 | 4/2008 | Zollino et al. |
| 2008/0091553 A1 | 4/2008 | Koski |
| 2008/0091616 A1 | 4/2008 | Helwin et al. |
| 2008/0097856 A1 | 4/2008 | Blagg et al. |
| 2008/0114737 A1 | 5/2008 | Neely et al. |
| 2008/0126145 A1 | 5/2008 | Rackley, III et al. |
| 2008/0133351 A1 | 6/2008 | White et al. |
| 2008/0140568 A1 | 6/2008 | Henry |
| 2008/0147883 A1 | 6/2008 | Philyaw |
| 2008/0162361 A1 | 7/2008 | Sklovsky et al. |
| 2008/0167965 A1 | 7/2008 | Von Nothaus et al. |
| 2008/0172274 A1 | 7/2008 | Hurowitz et al. |
| 2008/0172331 A1 | 7/2008 | Graves et al. |
| 2008/0177574 A1 | 7/2008 | Lara Gonzalez et al. |
| 2008/0177672 A1 | 7/2008 | Brunner et al. |
| 2008/0223918 A1 | 9/2008 | Williams et al. |
| 2008/0270300 A1 | 10/2008 | Jones et al. |
| 2008/0272188 A1 | 11/2008 | Keithley et al. |
| 2008/0319905 A1 | 12/2008 | Carlson |
| 2009/0006181 A1 | 1/2009 | Ghosh et al. |
| 2009/0024527 A1 | 1/2009 | Sellen et al. |
| 2009/0037255 A1 | 2/2009 | Chiu et al. |
| 2009/0048934 A1 | 2/2009 | Haddad et al. |
| 2009/0061884 A1 | 3/2009 | Rajan et al. |
| 2009/0063261 A1 | 3/2009 | Scribner et al. |
| 2009/0064056 A1 | 3/2009 | Anderson et al. |
| 2009/0076953 A1 | 3/2009 | Saville et al. |
| 2009/0076966 A1 | 3/2009 | Bishop et al. |
| 2009/0089176 A1 | 4/2009 | Mccabe |
| 2009/0089193 A1 | 4/2009 | Paintin |
| 2009/0104888 A1 | 4/2009 | Cox |
| 2009/0106151 A1 | 4/2009 | Nelsen et al. |
| 2009/0119176 A1 | 5/2009 | Johnson |
| 2009/0119211 A1 | 5/2009 | Johnson |
| 2009/0132347 A1 | 5/2009 | Anderson et al. |
| 2009/0132395 A1 | 5/2009 | Lam et al. |
| 2009/0144104 A1 | 6/2009 | Johnson |
| 2009/0164344 A1 | 6/2009 | Shiftan et al. |
| 2009/0171778 A1 | 7/2009 | Powell |
| 2009/0182664 A1 | 7/2009 | Trombley |
| 2009/0210300 A1 | 8/2009 | Cansler et al. |
| 2009/0222347 A1 | 9/2009 | Whitten |
| 2009/0233579 A1 | 9/2009 | Castell et al. |
| 2009/0234751 A1 | 9/2009 | Chan et al. |
| 2009/0241159 A1 | 9/2009 | Campagna et al. |
| 2009/0254471 A1 | 10/2009 | Seidel et al. |
| 2009/0254479 A1 | 10/2009 | Pharris |
| 2009/0254535 A1 | 10/2009 | Eickelmann et al. |
| 2009/0265274 A1 | 10/2009 | Hahn-Carlson et al. |
| 2009/0271265 A1 | 10/2009 | Lay et al. |
| 2009/0288012 A1 | 11/2009 | Hertel et al. |
| 2009/0307135 A1 | 12/2009 | Gupta et al. |
| 2009/0313132 A1 | 12/2009 | McKenna et al. |
| 2009/0327045 A1 | 12/2009 | Olives et al. |
| 2009/0327088 A1 | 12/2009 | Puthupparambil et al. |
| 2010/0004989 A1 | 1/2010 | Bonalle et al. |
| 2010/0005025 A1 | 1/2010 | Kumar |
| 2010/0009663 A1 | 1/2010 | Chang |
| 2010/0010964 A1 | 1/2010 | Skowronek et al. |
| 2010/0023386 A1 | 1/2010 | Avisar et al. |
| 2010/0023455 A1 | 1/2010 | Dispensa et al. |
| 2010/0036741 A1 | 2/2010 | Cleven |
| 2010/0036775 A1 | 2/2010 | Edens |
| 2010/0042456 A1 | 2/2010 | Stinchcombe et al. |
| 2010/0042537 A1 | 2/2010 | Smith et al. |
| 2010/0042540 A1 | 2/2010 | Graves et al. |
| 2010/0049879 A1 | 2/2010 | Leavitt et al. |
| 2010/0063903 A1 | 3/2010 | Whipple et al. |
| 2010/0076873 A1 | 3/2010 | Taylor et al. |
| 2010/0078471 A1 | 4/2010 | Lin et al. |
| 2010/0078472 A1 | 4/2010 | Lin et al. |
| 2010/0082444 A1 | 4/2010 | Lin et al. |
| 2010/0082445 A1 | 4/2010 | Hodge et al. |
| 2010/0082447 A1 | 4/2010 | Lin et al. |
| 2010/0082455 A1 | 4/2010 | Rosenblatt et al. |
| 2010/0082480 A1 | 4/2010 | Korosec |
| 2010/0082481 A1 | 4/2010 | Lin et al. |
| 2010/0082485 A1 | 4/2010 | Lin et al. |
| 2010/0082490 A1 | 4/2010 | Rosenblatt et al. |
| 2010/0082491 A1 | 4/2010 | Rosenblatt et al. |
| 2010/0088188 A1 | 4/2010 | Kumar et al. |
| 2010/0094730 A1 | 4/2010 | Koski |
| 2010/0100480 A1 | 4/2010 | Altman et al. |
| 2010/0121707 A1 | 5/2010 | Goeldi |
| 2010/0125492 A1 | 5/2010 | Lin et al. |
| 2010/0125495 A1 | 5/2010 | Smith et al. |
| 2010/0125803 A1 | 5/2010 | Johnson |
| 2010/0131347 A1 | 5/2010 | Sarptipi |
| 2010/0131415 A1 | 5/2010 | Sartipi |
| 2010/0155470 A1 | 6/2010 | Woronec |
| 2010/0161433 A1 | 6/2010 | White |
| 2010/0174599 A1 | 7/2010 | Rosenblatt et al. |
| 2010/0185505 A1 | 7/2010 | Sprogoe et al. |
| 2010/0185531 A1 | 7/2010 | Van Luchene |
| 2010/0191578 A1 | 7/2010 | Tran et al. |
| 2010/0191622 A1 | 7/2010 | Reiss et al. |
| 2010/0191770 A1 | 7/2010 | Cho et al. |
| 2010/0198626 A1 | 8/2010 | Cho et al. |
| 2010/0211445 A1 | 8/2010 | Bodington |
| 2010/0211452 A1 | 8/2010 | D'Angelo et al. |
| 2010/0211499 A1 | 8/2010 | Zanzot et al. |
| 2010/0217682 A1 | 8/2010 | Chan |
| 2010/0250351 A1 | 9/2010 | Gillenson et al. |
| 2010/0276484 A1 | 11/2010 | Banerjee et al. |
| 2010/0305848 A1 | 12/2010 | Stallman |
| 2010/0306075 A1 | 12/2010 | Drance et al. |

(56) References Cited

U.S. PATENT DOCUMENTS

| | | | |
|---|---|---|---|
| 2010/0306113 A1 | 12/2010 | Gray et al. | |
| 2010/0312645 A1 | 12/2010 | Niekadlik et al. | |
| 2010/0312676 A1 | 12/2010 | Muthukumaran | |
| 2010/0332262 A1 | 12/2010 | Horvitz et al. | |
| 2010/0332283 A1 | 12/2010 | Ng et al. | |
| 2011/0047075 A1 | 2/2011 | Fourez | |
| 2011/0078082 A1 | 3/2011 | Gupta | |
| 2011/0082789 A1 | 4/2011 | Boyd | |
| 2011/0099057 A1 | 4/2011 | Tenyer | |
| 2011/0105183 A1 | 5/2011 | Hsiao et al. | |
| 2011/0106698 A1 | 5/2011 | Isaacson et al. | |
| 2011/0137742 A1 | 6/2011 | Parikh | |
| 2011/0178896 A1 | 7/2011 | Nakajima et al. | |
| 2011/0184827 A1 | 7/2011 | Hubert | |
| 2011/0215146 A1 | 9/2011 | Shams | |
| 2011/0218870 A1 | 9/2011 | Shams et al. | |
| 2011/0246290 A1 | 10/2011 | Howard et al. | |
| 2011/0258123 A1 | 10/2011 | Dawkins et al. | |
| 2011/0296508 A1 | 12/2011 | Os et al. | |
| 2011/0320344 A1 | 12/2011 | Faith et al. | |
| 2012/0011063 A1 | 1/2012 | Killian et al. | |
| 2012/0022943 A1 | 1/2012 | Howard et al. | |
| 2012/0023026 A1 | 1/2012 | Chen et al. | |
| 2012/0030101 A1 | 2/2012 | Boyd | |
| 2012/0036071 A1 | 2/2012 | Fulton et al. | |
| 2012/0084204 A1 | 4/2012 | Castell et al. | |
| 2012/0095895 A1 | 4/2012 | Aston | |
| 2012/0101881 A1 | 4/2012 | Taylor et al. | |
| 2012/0116966 A1 | 5/2012 | Tan | |
| 2012/0118950 A1 | 5/2012 | Belk | |
| 2012/0123838 A1 | 5/2012 | Sparks | |
| 2012/0136780 A1 | 5/2012 | El-Awady et al. | |
| 2012/0166333 A1 | 6/2012 | Von Behren et al. | |
| 2012/0173431 A1 | 7/2012 | Ritchie et al. | |
| 2012/0190386 A1 | 7/2012 | Anderson | |
| 2012/0215640 A1 | 8/2012 | Ramer et al. | |
| 2012/0215650 A1 | 8/2012 | Oba et al. | |
| 2012/0221421 A1 | 8/2012 | Hammad | |
| 2012/0221502 A1 | 8/2012 | Jerram et al. | |
| 2012/0231844 A1 | 9/2012 | Coppinger | |
| 2012/0259763 A1 | 10/2012 | Pessin | |
| 2012/0304273 A1 | 11/2012 | Bailey et al. | |
| 2012/0310826 A1 | 12/2012 | Chatterjee | |
| 2012/0323664 A1 | 12/2012 | Klems | |
| 2013/0090750 A1 | 4/2013 | Herrman et al. | |

FOREIGN PATENT DOCUMENTS

| | | |
|---|---|---|
| KR | 10-0432430 | 5/2004 |
| KR | 06-0117177 | 11/2006 |
| KR | 07-0104087 | 10/2007 |
| WO | WO01/165502 | 9/2001 |
| WO | WO03023674 | 4/2004 |
| WO | WO2010/148737 | 12/2010 |

OTHER PUBLICATIONS

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, p. 1.
Gopalan, NP & Selvan, B Siva. TCP/IP Illustrated. Prentice-Hall. 2008. pp. 101-102, 175-176 and 235.
International Search Report and Written Opinion for PCT/US09/54921 mailed Oct. 21, 2009.
International Search Report and Written Opinion for PCT/US2010/048344 mailed Nov. 15, 2010.
International Search Report and Written Opinion for PCT/US2010/033861 mailed Dec. 9, 2010.
International Search Report and Written Opinion for PCT/US2010/033547 mailed Dec. 14, 2010.
International Preliminary Report on Patentability for PCT/US2010/033229 mailed Dec. 29, 2010.
International Search Report and Written Opinion for PCT/US2010/041860 mailed Feb. 1, 2011.
International Search Report and Written Opinion for PCT/US2010/045445 mailed Feb. 24, 2011.
International Search Report and Written Opinion for PCT/US2010/045500 mailed Mar. 29, 2011.
International Search Report and Written Opinion for PCT/US2011/024941 mailed Apr. 19, 2011.
International Search Report and Written Opinion for PCT/US2010/046833 mailed Apr. 26, 2011.
International Search Report and Written Opinion for PCT/US2011/26734 mailed Apr. 29, 2011.
International Search Report and Written Opinion for PCT/US2011/29790 mailed May 19, 2011.
International Search Report and Written Opinion for PCT/US2011/035268 mailed Aug. 5, 2011.
International Search Report and Written Opinion for PCT/US2011/032093 mailed Aug. 24, 2011.
International Search Report and Written Opinion for PCT/US11/39178 mailed Sep. 16, 2011.
International Search Report and Written Opinion for PCT/US2011/42062 mailed Sep. 29, 2011.
International Search Report for PCT/US11/49393 mailed Dec. 5, 2011.
International Search Report and Written Opinion for PCT/US11/57179 mailed Jan. 5, 2012.
International Search Report and Written Opinion for PCT/US11/57173 mailed Mar. 15, 2012.
International Search Report and Written Opinion for PCT/US11/57180 mailed Mar. 15, 2012.
International Search Report for PCT/US12/21000 mailed May 15, 2012.
International Search Report for PCT/US11/65305 mailed Apr. 16, 2012.
International Search Report for PCT/US12/26205, mailed May 29, 2012.
International Search Report for PCT/US12/23856 mailed Jun. 6, 2012.
International Search Report and Written Opinion for PCT/US2012/027043 mailed Jul. 13, 2012.
International Search Report for PCT/US12/24772 mailed Jul. 24, 2012.
International Search Report for PCT/US12/25530 mailed Aug. 7, 2012.
International Search Report PCT/US12/27620 mailed Aug. 10, 2012.
International Search Report and Written Opinion for PCT/US12/41437 mailed Aug. 24, 2012.
International Search Report and Written Opinion for PCT/US12/37597 mailed Sep. 21, 2012.
International Search Report for PCT/US12/39638 mailed Sep. 24, 2012.
International Search Report for PCT/US12/45875 mailed Nov. 16, 2012.
International Search Report for PCT/US12/47o92 mailed Nov. 26, 2012.
International Search Report for PCT/US12/57577 mailed Nov. 29, 2012.
International Search Report and Written Opinion for PCT/US12/55636 mailed Nov. 30, 2012.
International Search Report for PCT/US12/57528 mailed Dec. 17, 2012.
International Search Report and Written Opinion for PCT/US2012/045601 mailed Feb. 1, 2013.
International Search Report and Written Opinion for PCT/US12/66898 mailed Feb. 11, 2013.
International Search Report and Written Opinion for PCT/US2012/069557 mailed Feb. 22, 2013.
International Search Report for PCT/US12/56759 mailed Feb. 25, 2013.

(56) References Cited

OTHER PUBLICATIONS

International Search Report and Written Opinion for PCT/US12/65738 mailed Apr. 19, 2013.
International Search Report and Written Opinion for PCT/US2013/020411 mailed May 21, 2013.
International Search Report and Written Opinion for PCT/US2013/024538, mailed May 31, 2013.

* cited by examiner

SYSTEM AND METHOD FOR IMPLEMENTING FINANCIAL ASSISTANCE PROGRAMS

PRIORITY CLAIM

This application is a continuation of and hereby claims priority to, pending U.S. patent application Ser. No. 12/229,760, entitled "System and Method for Implementing Financial Assistance Programs," filed on Aug. 26, 2008.

FIELD OF THE DISCLOSURE

The present disclosure relates to systems and methods for implementing financial assistance programs and, more particularly, to systems and methods employing a commercial payment processing network when processing benefits provided under the financial assistance program.

BACKGROUND

Local, state and federal governments routinely fund and/or administer a wide variety of financial assistance programs. Such programs include, among others, food stamps, aid to dependent children, unemployment insurance, WIC and the like. While programs such as these provide financial assistance to those in need, the implementation thereof can have adverse effects on the recipients of the benefits distributed thereunder. Many people still view receiving government assistance as a stigma and are often embarrassed when others become aware of that fact, for example, when purchasing groceries using food stamps. While the ongoing transition from the use of paper coupons to electronic benefit transfer (EBT) cards has enabled food stamp recipients to make purchases much more discretely, the electronic readers and/or point of sale (POS) systems employed in such transactions process EBT cards differently than debit and credit cards. For example, when purchasing groceries using an EBT card, the person using the card is required to identify the purchase as an EBT transaction. As a result, those nearby learn that the person is on food stamps, again producing an embarrassing moment for those sensitive to the fact that they are on public assistance.

In addition, public assistance programs are often plagued by high administrative costs. Moreover, such administrative costs often spill over into the private sector. For example, it is generally acknowledged that participation in the food stamp program causes merchants to incur additional administration costs. As a result, merchants accepting food stamps typically receive financial compensation from the governmental entity administering the food stamp program, thereby reducing the financial resources available to assist those in need. Even with financial assistance, however, many merchants are unwilling to accept the administrative burden accompanying participation in the program. This can result in the use of food stamps becoming unduly burdensome. For example, if the grocery stores closest to a food stamp recipient decline to participate in the program, the recipient can be forced to travel a considerable distance in order to purchase goods using the food stamps. This is particularly troublesome in that those receiving food stamps are most likely those who lack access to private transportation in order to travel to the merchant who does accept food stamps.

Further, food stamp programs adhere to a very traditional model of retailing in which all or nearly all of the foodstuffs which may be purchased using the benefits provided under the program are only available at the local grocery store. However, goods suitable for purchase using food stamps are available in a wide variety of retail stores. For example, a store specializing in athletic equipment may elect to sell a limited number of food items identified as appealing to people who exercise regularly. Convenience stores, on the other hand, sell a wide variety of goods, including staples such as milk and bread, suitable for purchase with food stamps. Thus, there are many retail outlets to which participation in the food stamp program may be extended but that do not currently participate due to the high administrative costs associated with, and/or an expectation of a relatively low volume of sales under, the program.

Finally, the proliferation of financial assistance programs has resulted in additional inefficiencies which consume a portion of the funds intended to be spent to assist those in need. For example, many of those in financial need are qualified to receive aid from multiple sources. For example, a food stamp recipient may also qualify for state unemployment insurance, aid to dependent children and/or WIC. If so, each agency providing financial assistance to a particular individual employs a separate process to distribute funds to that individual. Clearly, if a single process may be used to distribute financial assistance from multiple agencies to an individual, the cost of distributing benefits to that individual could be reduced, thereby decreasing the total cost of administering the various aid programs.

Commercial payment processing networks are employed in a growing number of commercial and/or financial transactions. In such transactions, the role of the commercial payment processing network is to ensure that a party which provides goods and/or services to another is reimbursed for those goods and/or services. Briefly, the commercial payment processing network electronically couples the issuer of a debit or credit card with the merchant or, more specifically, an acquirer who maintains funds on behalf of the merchant. When a party seeks to pay for a transaction using a credit or debit card, the commercial payment processing network notifies the issuer of the card to transfer the requested amount of funds to the acquirer. It is contemplated that it would be advantageous to employ a commercial payment processing network in a system and method for distributing benefits provided under financial assistance programs. Accordingly, disclosed herein is such a system and method.

SUMMARY

In one embodiment, disclosed herein is a device suitable for use in initiating a commercial transaction. The disclosed device is comprised of a storage media and data encoded therein. The data encoded in the storage media includes information identifying a recipient of financial assistance and a commercial payment processing network to be used when completing the transaction. The date encoded in the storage media may also include the amount of financial assistance provided to the recipient and/or restrictions (if any) on usage of the provided financial assistance. In one aspect, the device is imprinted with the name of the recipient and indicia identifying the commercial payment processing network.

In another embodiment, disclosed herein is a method for providing government benefits to a recipient. In accordance with the disclosed method, an issuer produces a consumer access device (or "card"), imprinted with the name of the recipient of government benefits and indicia representative of a commercial payment processing network to be used when processing transactions which employ the card. Encoded in the card is data identifying the commercial payment processing network and the issuer of the card. Once produced, the card is provided to the recipient of government benefits. In accordance with an aspect thereof, a cash value of the government benefits to be provided to the recipient is determined and the name of the recipient and the cash value of the benefits are provided to the issuer. Using this information, the card produced by the issuer may have a cash value generally equal to the cash value of the government benefits to be provided to the recipient.

In further aspects thereof, the recipient may use the card as a form of payment for goods and/or services received from a merchant or other business entity during a transaction therewith. In turn, the merchant transmits a message requesting authorization of the transaction to the issuer via the commercial payment processing network. To enable the issuer to determine whether to authorize the transaction, the message also identifies the recipient and the cash value of the goods and/or services to be provided to the recipient if the transaction is completed. In response thereto, the issuer transmits a reply message which either authorizes or declines the transaction. Typically, the transaction is authorized when the value of the goods and/or services is less than the balance of the card but rejected if the balance of the card is greater than the value of the goods and/or services. In this aspect the balance of the card is the cash value of the government benefit provided to the recipient less the value of the goods and/or services provided to the recipient in connection with prior transactions initiated using the card.

In still further aspects thereof, the issuer is further provided with a set of restrictions on the use of the government benefits provided to the recipient. Variously, the set of restrictions may be maintained by the issuer for subsequent use by the issuer to determine whether to authorize the transaction or encoded into the card so that the merchant or the commercial payment processing network may determine whether the transaction complies with any restrictions placed on the use of the card. In the alternative, the governmental entity or issuer may provide the merchant or the commercial payment processing network with the set of restrictions. If the commercial payment processing network is responsible for identifying violations of any such restrictions, the commercial payment processing network shall also be responsible for issuing the message declining the transaction as not in compliance with restrictions imposed on the use of the card. Variously, the benefits may be provided by a single governmental entity or by multiple government entities. When multiple governmental entities are involved, the cash value of the card is the sum of the cash value of the benefits to be provided to the recipient by the various governmental entities.

In still another embodiment, disclosed herein is a commercial payment processing network comprised of a server configured to process transactions funded by government benefits encoded in consumer access devices (or "cards") imprinted with indicia identifying the commercial payment processing network. In one aspect, identifying information for an issuer is encoded in the cards and, in this aspect, the server is further configured to exchange information related to the transactions with the issuer via an electronic coupling therebetween. In another, the server is further configured to exchange information related to the transactions with acquirers of the cash value of the transactions via an electronic coupling therebetween and, in still another, the server is further configured to reject the transactions based upon failures of the financial transactions to comply with restrictions on the use of the government benefits encoded in the cards.

In still another embodiment, disclosed herein is an electronic financial network which includes a plurality of consumer access devices (or "cards"), each encoded with information identifying a recipient of a determined amount of government benefits, and a commercial payment processing network. The electronic financial network further includes a commercial or financial transaction server system coupled to an issuer server system by the commercial payment processing network. The issuer server system maintains information related to each one of the plurality of cards, including identifying information for the recipient of the card, the government benefits to be provided to the recipient of the card, a cash value for each of the government benefits to be provided to the recipient of the card and any restrictions on transactions initiated with the card. Each of the plurality of cards may be used to initiate transactions at terminals coupled to the transaction server system. Information related to the initiated transactions is exchanged between the transaction server system and the issuer server system by the commercial payment processing network. The information transported by the commercial payment processing network includes requests for authorizing the transaction server system to complete transactions, reply messages authorizing the transaction server system to complete transactions and reply messages denying the transaction server system authorization to complete transactions. To determine whether to authorize completion of a transaction initiated with one of the cards, the issuer server system may include means for determining whether to authorize completion of transactions initiated with the cards based upon information related to the cards maintained by the issuer server system and information, received from the commercial payment processing network, related to the transactions themselves.

In one aspect of the disclosed embodiment, the financial server system is configured to include one or more point-of-sale (POS) systems, each configured to conduct transactions initiated using the first card, and a merchant server system coupled to the POS systems and the commercial payment processing network. In this aspect, the POS systems transmit information, collected from the cards, to the merchant server system. In turn, the merchant server system transmits the information to the commercial payment processing network for forwarding to the issuer server system. In another, the electronic financial network is configured to include an acquirer server system coupled between the merchant server system and the commercial payment processing network. In this aspect, the acquirer server system transmits information related to transactions, received from the merchant server system, to the commercial payment processing network. Upon approval of these transactions, the issuer server system transmits funds generally equal to the cost of the goods and/or services associated with the transactions to the acquirer server system via the commercial payment processing network and updates information related to the cards maintained thereby to account for the funds transmitted to the acquirer server.

DESCRIPTION OF THE DRAWINGS

For a more complete understanding of the present invention, and for further details and advantages thereof, reference is now made to the drawings accompanying this disclosure, in which.

DETAILED DESCRIPTION

Figure 1A:
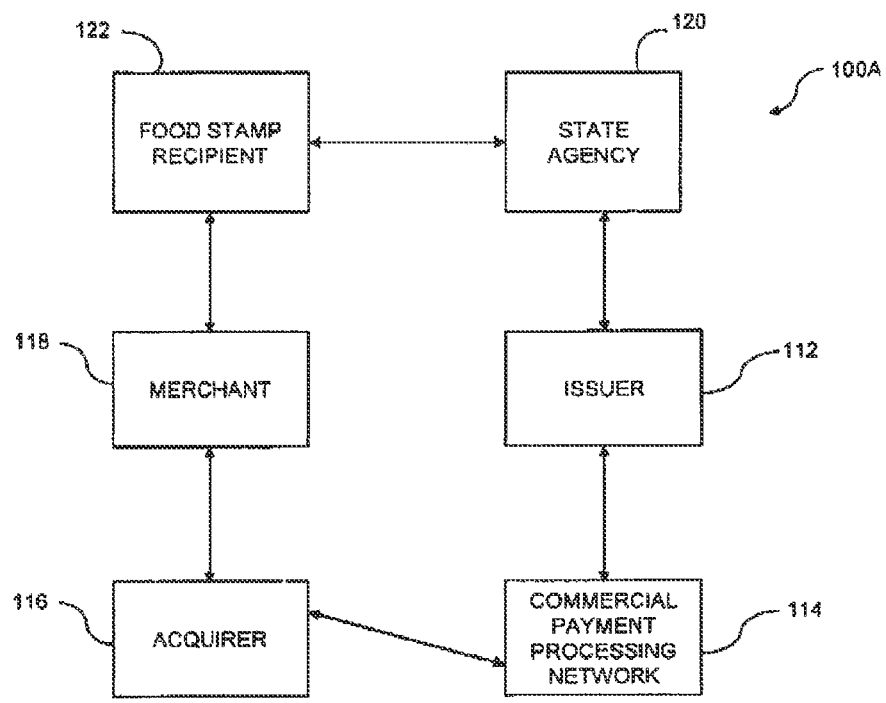
FIG. 1A is a block diagram illustrating a financial assistance program which incorporates a commercial payment processing system therein.

The teachings set forth herein are susceptible to various modifications and alternative forms, specific embodiments of which are, by way of example, shown in the drawings and described in detail herein. It should be clearly understood, however, that the drawings and detailed description set forth herein are not intended to limit the disclosed teachings to the particular form disclosed. On the contrary, the intention is to cover all modifications, equivalents and alternatives falling within the spirit and scope of that which is defined by the claims appended hereto.

Figure 1B:
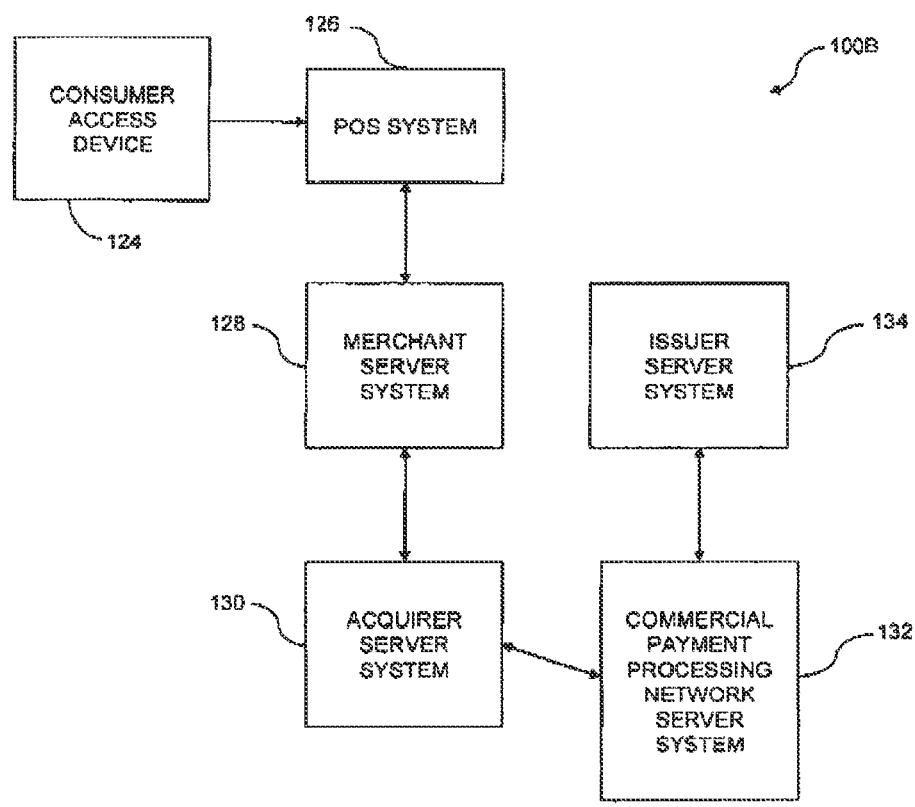
FIG. 1B is a block diagram illustrating a commercial payment processing system constructed in accordance with the teachings disclosure herein and suitable for implementing the financial assistance program of FIG. 1A.
Figure 2:
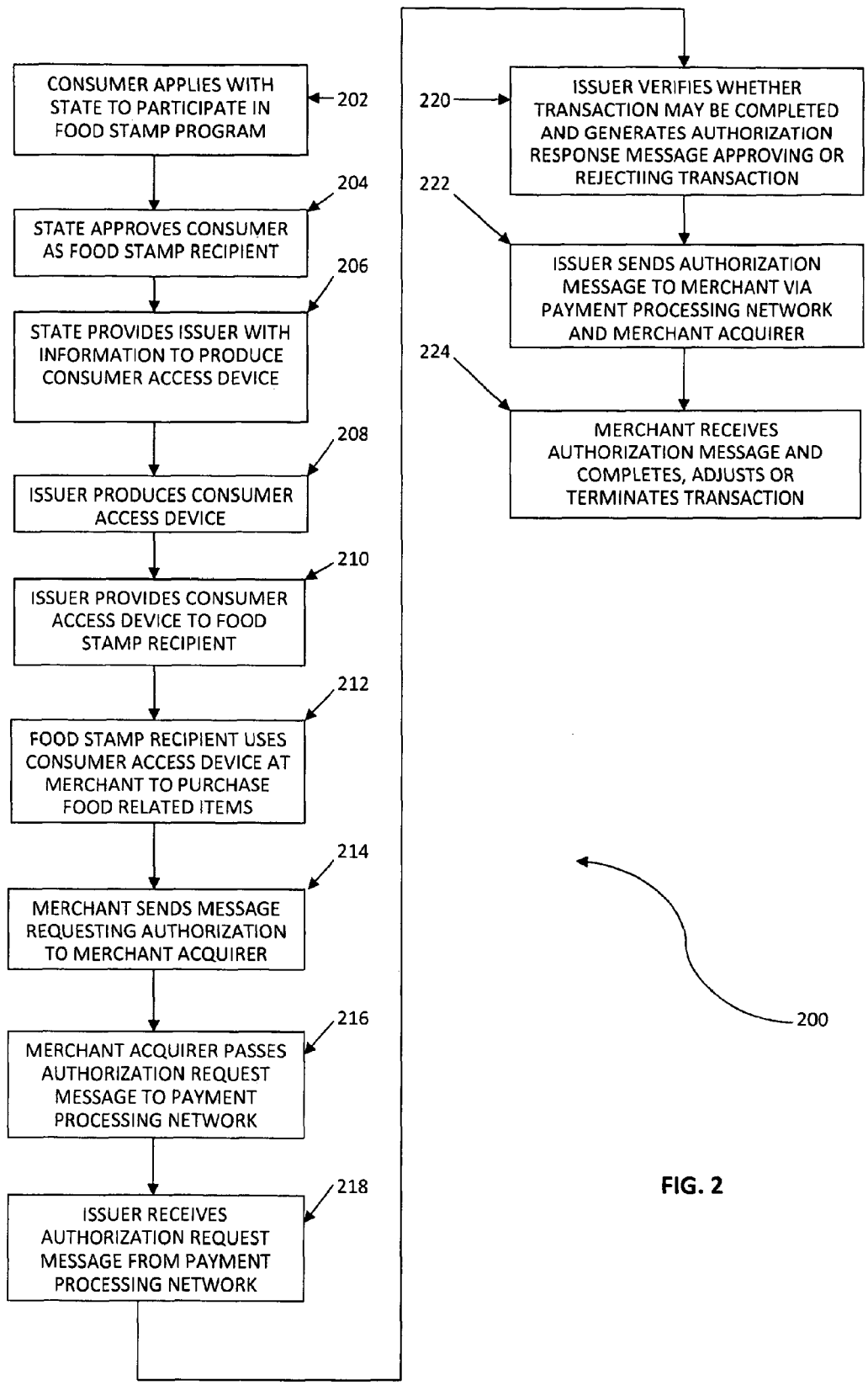
FIG. 2 is a flow chart of a process by which the commercial payment processing system of FIG. 1B attends to the transfer of benefits from a financial assistance program to a recipient thereof.

Referring, in combination, to FIGS. 1A, 1B and 2, a commercial payment processing system 100b constructed in accordance with the teachings of the present disclosure and suitable for implementing a financial assistance program 100a in which a governmental entity provides financial assistance to a recipient who, in turn, uses the financial assistance to conduct transactions with a business entity. For example, the present disclosure describes a particular type of financial assistance program 100a, specifically, the Food Stamp Program (FSP) administered by the Food and Nutrition Service (FNS) of the United States Department of Agriculture (USDA). Under the FSP, food stamps are distributed to qualifying recipients 122, for example, persons with low income, who use the food stamps to purchase foodstuffs at a participating merchant 118, typically, a grocery store. Of course, the FSP is but one example of a financial assistance program 100a suitable for implementation by the commercial payment processing system 100b and it is fully contemplated that the commercial payment processing system 100b is equally suitable for implementing a wide variety of financial assistance programs 100a other than the specific financial assistance program described herein.

For example, it is contemplated that the benefit provider may be the federal government (or agency thereof), state government, local government such as a county, city or town government (or agency thereof) or a regional governmental authority. It is further contemplated that the benefit provider may be a private charitable organization, a for-profit business organization, or even an individual. Likewise, it is contemplated that the benefit provided may be comprised of an unrestricted grant of cash or a restricted grant of cash, e.g., a grant of cash which can only be used for the purchase of (1) a specified good sold at any merchant, (2) a specified type of goods sold at any merchant; (3) a specified good or type of goods sold at a specified merchant or (4) any type of goods sold at a specified merchant. Of course, it should be readily appreciated that restricted grants of cash may be comprised of other combinations of these or other restrictions as well.

Further by way of example, it is contemplated that the recipient 122 may be an individual who has qualified to receive the benefit. For example, a person who has verifiable income less than a predetermined threshold may qualify to receive food stamps from a state agency responsible for administering the FSP locally. It is further contemplated that the recipient 122 may be a charitable organization such as a 501(c)(3) corporation. For example, the recipient 122 may be a local food bank which distributes food to impoverished individuals. Again, the foregoing are provided purely by way of example and that there are any number of other combinations (e.g., benefit provider, benefit and recipient) which may be instead employed.

Further aspects of the transfer of benefits from a provider to a recipient will now be described with respect to a specific example in which the benefit provider is a state agency 120, the benefit is food stamps—vouchers which may be used to purchase specified types of food items up to the specified value of the vouchers—and the recipient 122 is a food stamp recipient, e.g., persons that are unemployed, employed but having a relatively low income, employed but having a relatively large number of dependents or a combination of these or other factors which qualify them as being entitled to receive food stamps from the state. In this example, as well as many (but not all) of the other examples addressed hereinabove, the commercial payment processing system 100b implementing the financial assistance program 100a in which the state agency 120 provides food stamps to the food stamp recipient 120 involves the participation of four other entities—an issuer 112, a commercial payment processing network 114, an acquirer 116 and a merchant 118. Of course, it is fully contemplated that a lesser or greater number of entities may participate in the payment processing system. For example, the commercial payment processing network 114 may also serve as the issuer.

Each of the issuer 112, the commercial payment processing network 114, the acquirer 116 and the merchant 118 operate one or more electronic devices for processing a portion of a transaction which provides the benefit to the recipient. In the example illustrated herein, the merchant operates a point-of-sale (POS) system 126 and a merchant server system 128 coupled to the POS system 126, the acquirer 116 operates an acquirer server system 130 coupled to the merchant server system 128, the commercial payment processing network 114 operates a commercial payment processing network server system 132 coupled to the acquirer server system 130 and the issuer 112 operates an issuer server system 134 coupled to the commercial payment processing network server system 132. While FIG. 1B illustrates the couplings between the merchant server system 128 and the acquirer server system 130, between the acquirer server system 130 and the commercial payment processing network server system 132 and between the commercial payment processing network server system 132 and the issuer server system 134 as discrete interconnections, it is fully contemplated that one or more of the illustrated interconnections may be accomplished through use of a shared network such as the Internet. Of course, in the event that a public network is employed, messages exchanged between the various components of the commercial payment processing system 100b should be encrypted or otherwise secured from interception by a third party.

As disclosed herein, the term "server system" encompasses all known types of computing devices, for example, personal computers (PCs), which perform the functions set forth hereinbelow, whether such functions are performed by a single computing device or multiple computing devices networked or otherwise interconnected with one another. As further disclosed herein, a "server system" is comprised of a processor subsystem coupled to a memory subsystem by a bus subsystem. The term "processor subsystem" encompasses the total processing capacity of the server system, whether such processor capacity is embodied as a single processing device, for example, a microprocessor, multiple processing devices, for example, coprocessors, located in a single computing device, multiple processing devices residing in respective computing devices interconnected with one another or any combinations thereof. Similarly, the term "memory subsystem" encompasses the total memory capacity of the server subsystem, whether such memory capacity is embodied as main, auxiliary or other type of memory of a single computing device, main, auxiliary or other type of memory of multiple computing devices interconnected with one another, a stand-alone memory device, or any combinations thereof. Finally, the term bus subsystem encompasses all of the conductors and/or other types of connectors used to transfer address, data and control signals between the various components and/or devices which collectively comprise the server system.

The process 200 by which food stamps are transferred to a recipient commences at 202 with an applicant, e.g., a consumer that believes that they are entitled to receive food stamps, submitting an application to receive food stamps to a state agency 120 charged with the task of distributing food stamps to qualified applicants. Depending on the particular application system employed by the state agency 120, it is contemplated that the consumer may be permitted to submit their application to receive food stamps in person, over the phone and/or via the Internet. The state agency 120 will then process the application. For example, the state agency 120 may have a set of guidelines which define those people entitled to receive food stamps and would examine the application and/or conduct an investigation to determine whether the applicant is indeed eligible to receive food stamps from the state agency 120.

Upon confirming that the applicant qualifies for participation in the food stamp program, the process 200 continues to 204 where the state agency 120 approves the applicant for enrollment in the program. Having enrolled the applicant (hereafter referred to as food stamp recipient 122, the state agency 120 initiates a process by which the food stamp recipient 122 shall receive food stamps from the state agency 120. Accordingly, at 206, the state 120 provides the issuer 112 with information, to be used by the issuer 112, to both produce and subsequently monitor the use of a consumer access device 124, to be distributed to the food stamp recipient 122, to enable the food stamp recipient 122 to purchase eligible products in accordance with the guidelines of the FSP. Typically, the state agency 120 provides the issuer 112 with sufficient information to identify the food stamp recipient 122, for example, the name and address of the food stamp recipient 122, and the amount of funds, for example, a cash value in dollars, to be provided to the food stamp recipient 122 as a participant in the FSP. Variously, the state agency 120 may pay, to the issuer 112, the cash value of the access card 124 at this time or, at a mutually agreeable subsequent point in time. Further, the state agency 120 may elect to pay a fee to the issuer 112 to cover the cost of producing the consumer access device 124 directly or may agree that the issuer 112 take a predetermined fee for each transaction for which the consumer access device 124 is used. Variously, the fee for use of the access card may be a flat fee per transaction or a variable fee set as a percentage of the amount of the transaction and may be charged to the state agency or, if desired, debited from the cash value of the consumer access device 124.

In one embodiment, the state agency 120 shall also provide the issuer with any restrictions to be placed on the funds applied to the consumer access device 124. Depending on the type of financial assistance to be provided to a recipient, the funds may be comprised of a one-time transfer of cash or, as is the case with food stamps, periodic transfers of cash made on a regular basis, for example, on the first of each month. Likewise, restrictions may be applied on the permitted usages of the consumer access device 124. For example, restrictions commonly applied on the funds provided to the food stamp recipient 122 may include time restrictions, e.g., all of the provided funds must be used within a predetermined time period, for example, during the month in which the funds were disbursed. The state agency 120 may also provide a list of the type or types of goods that may be purchased using the funds and/or the type or types of goods that may not be purchased using the funds. For example, the state agency 120 may allow the food stamp recipient 122 to use the provided funds to purchase bread but bar the food stamp recipient 122 from using the provided funds to purchase alcohol.

If desired, all of the foregoing information (or selected components thereof) may be maintained in the memory subsystem of the issuer server system 134, stored in the consumer access device 124 or both. At a minimum, the name of the food stamp recipient 122 (or a set of alphanumeric characters suitable for anonymously identifying the food stamp 122) should be stored in the consumer access device 124. Typically, the cash value assigned to the consumer access device 124 is maintained in the memory subsystem of the issuer server system 134. A shortcoming to configuring the commercial payment processing system 100*b* in this manner is that transactions may only be completed when all components of the commercial payment processing system 100*b* are on-line. If, however, the cash value of the consumer access device 124 is encoded onto the consumer access device 124, transactions may be completed at other times as well, for example, when the issuer server system 134 is off-line. Such a configuration is, however, less common.

Likewise, while any restrictions on the use of the consumer access device 124 may be stored on the consumer access device 124, more commonly, any such restrictions are maintained at another location, for example, the memory subsystem of the issuer server system 134, a memory device associated with the POS system 126 or even the memory subsystem of one or more of the merchant server system 128, the acquirer server system 130 or the commercial payment processing network server system 132. In this regard, while, in the interest of efficiency, it may be preferable that any restrictions on the use of the consumer access device 124 be stored at the POS system 126, it should be recognized that certain drawbacks may result from the foregoing. For example, it is entirely possible that the operator of the POS system 126 (or others nearby) will learn that the food stamp recipient 122 is seeking to purchase goods with food stamps and not a credit or debit card, particularly if the transaction is rejected as violating a restriction associated with the consumer access card 124. Thus, if discretion is of particular importance, it may be preferable to store any restrictions on the use of the consumer access device elsewhere, for example, on the issuer server system 134. Further, in the event that the consumer access device 124 is associated with benefits provided by multiple programs, for example, food stamps provided by the state agency and unemployment benefits provided by the state workforce commission, it may be more advantageous to store restrictions on the use of the consumer access device 124 on the issuer server system 134 as it is more likely that the issuer server system 134 will be able to readily ascertain the specific benefit that the food stamp recipient 122 is seeking to access using the consumer access device 124.

Proceeding now to 206, upon receiving the necessary information and, most likely, an amount of cash generally equal to the cash value of the benefits that the state agency has determined are to be provided to the food stamp recipient 122, the issuer 112 produces an consumer access device 124 to be used by the food stamp recipient 122 to receive the benefits provided by the state agency 120, here, by enabling the food stamp recipient 122 to purchase goods having a total value generally equal to the cash value of the benefits to which the food stamp recipient is entitled. While it is contemplated that the consumer access device 124 may be variously configured, as disclosed herein, the consumer access device 124 is similar in size, shape and overall appearance to the credit, debit and/or gift cards used by most consumers today. Accordingly, in the disclosed embodiment, the consumer access device 124 is configured to have a generally rectangular shape with a length of about 8.5 cm, a height of about 5.4 cm and a thickness of about 1 mm.

A front side surface of the consumer access device 124 is embossed, preferably using raised alpha-numeric characters, with the name of the food stamp recipient 122, an identification number for the consumer access device 124 and, if desired, an "expiration date" for the consumer access device 124. If the consumer access device 124 is embossed with an expiration date, in one embodiment, the expiration date may identify the last day on which the consumer access device 124 may be used for the purchase of goods using the funds associated therewith. In another, the consumer access device 124 may be imprinted with the day by which the food stamp recipient 122 must verify continued eligibility for participation in the food stamp program or be faced with losing their benefits under the program.

It is preferred that the consumer access device 124 used to provide benefits to the food stamp recipient 122 be virtually indistinguishable from other consumer access devices, e.g., credit and debit cards, in wide use today. To achieve this, it is preferred that the front side surface of the consumer access device 124 be imprinted with the name and, if appropriate, a logo of the issuer 112 and an emblem or other indicia representative of the name of the commercial payment processing network 114 employed during the process 200 to reimburse the merchant 118 for the cost of goods purchased by the food stamp recipient 122 using the consumer access device 124 by attending to the transfer of funds from the issuer 112 to the acquirer 116. Variously the issuer 112 may be a bank, credit union or other financial institution, for example, Bank of America, in the business of issuing consumer access devices such as credit or debit cards. Among the leading commercial payment processing networks which may serve as the commercial payment processing network 114 for the process 200 are Visa, MasterCard, Discover and American Express. To further emulate the credit and debit cards carried by consumers not receiving food stamp benefits, the identification number embossed on the consumer access device 124 should be configured in a manner generally identical to the identification number used by the payment processing network whose emblem is imprinted on the front side surface thereof. For example, if the Visa payment processing network is employed to reimburse merchants for goods purchased by the food stamp recipient 122, the consumer access device 124 should be embossed with a 16-digit account number divided into four groups of digits, each having four digits, with the first digit of the first group being the number "4." In one embodiment, it is contemplated that the issuer 112 and the commercial payment processing network 118 may be the same business entity. If so, the appearance of the consumer access device 124 should be modified in a corresponding manner.

The consumer access device 124 further includes a rear side surface in which a storage media encoded with, at a minimum, sufficient information to identify the food stamp recipient 122, is embedded or otherwise fixedly attached thereto. In further emulation of the credit and debit cards currently in use, it is contemplated that the storage media is comprised of an approximately 0.8 cm wide magnetic strip extending lengthwise, across the consumer access device 124, approximately 0.5 cm below and in a generally parallel relationship with a side surface thereof. Of course, it is fully contemplated that the consumer access device 124 and/or storage media may have alternate configurations. In one such example, the consumer access device 124 may be a so-called "smart card" and the storage media may be an integrated circuit incorporated therein. In another such example, the storage media may be omitted and the information to be encoded in the storage media may instead be imprinted on the consumer access device 124 as a bar code. Finally, it is contemplated that the configuration of the consumer access device 124 may vary in configuration to take into account any evolution in the shape of credit and debit cards and/or the manner by which the ordinary consumer purchases goods and/or services.

At 210, the consumer access device 124 produced by the issuer 112 is provided to the food stamp recipient 122. In one embodiment, it is contemplated that the issuer 112 would deliver the consumer access device 124 directly, for example, by mailing the consumer access device 124 to the address of record for the food stamp recipient 122. In another, it is contemplated that the issuer 112 would deliver the produced consumer access device 124 to the state agency 120. In turn, the state agency 120 would deliver the consumer access device 124 to the food stamp recipient 122. Ideally, the consumer access device 124 would be delivered generally contemporaneously with notification of the acceptance of the applicant into the food stamp program. It is recognized, however, that some delay between the two may inevitably result. Any such delay should, however, be minimized wherever possible.

In many cases, the consumer access device 124 would be delivered together with a list of restrictions, if any, on use of the card. Such restriction may include, among others, the total value, in dollars, of goods which may be purchased with the consumer access device 124, the quantity of a specific good or goods which may be purchased using the consumer access device 124, the type of goods which may not be purchased using the consumer access device 124 and/or the expiration date (if any) after which goods may not be purchased using the benefits provided through the access card 124. Of course, the restrictions listed hereinabove are purely exemplary and it is fully contemplated that still other restrictions may be placed on the purchase of goods using the funds available through the consumer access device 124. It is further contemplated that no restrictions may be placed on the goods that may be purchased using the benefits provided through the consumer access device 124. For example, if the benefit to be provided to a recipient is unemployment insurance, usage of the funds available through the consumer access device 124 would most likely be unrestricted.

At 212, the food stamp recipient 122 employs the consumer access device 124 in a transaction such as a purchase of goods at a selected merchant 118. For example, if the food stamp recipient 122 seeks to purchase foodstuffs at a grocery store, the food stamp recipient 122 would select the items to be purchased and present the selected items at the POS system 126 operated by the merchant 118. While a wide variety of POS systems are employed in the retail industry, a typical POS system includes a first data entry system, for example, an optical scanner utilized to scan the universal price code (UPC) for each item selected by the food stamp recipient 121 into the POS system 126, a processor for associating the UPC codes with the specific goods being purchased and the price of those goods and calculating the total cost of the transaction purchase, a second data entry system, for example, a device having plural pushbuttons for consumers to identify the consumer access device to be employed for rendering payment for the goods being purchased and an electronic scanner utilized for reading data encoded on a magnetic strip on a back side of consumer access devices "swiped" through or otherwise inserted into a slot in the scanner and a printer which, subsequent to the purchase being completed, generates a receipt comprised of a list of the goods purchased, the price of each one of the good purchased, the total cost for the purchase of the goods and the manner in which payment for the goods was rendered.

When a cashier or other operator of the POS system 126 has determined the total cost of the goods to be purchased and requests payment for those goods, the food stamp recipient 122 initiates payment for the proposed purchase using the consumer access device 124. For example, for a POS system including the second data entry device described herein, the food stamp recipient 122 would first indicate that the consumer access device 124 is a "credit card" (thereby eliminating any embarrassment which may result from the food stamp recipient 122 from being required to identify themselves as a person receiving financial assistance from the government) and then swipe the consumer access device 124 through the slot in the electronic scanner.

At 214, the POS system 126 collects selected information regarding the purchase and transmits the information to the merchant server system 128. Having transmitted the information to the merchant server system 128, the purchase of the selected goods is considered to be a pending transaction. Using the transmitted information, the merchant server system 128 generates a message requesting authorization of the pending transaction and forwards the message to the acquirer server system 130. Of course, it is fully contemplated that, in the alternative, the POS system 126 may generate the message and the merchant server system 128 merely forward the generated message to the acquirer server system 130. To facilitate making a determination as to whether the request for authorization should be granted, the message should contain both details describing the requested purchase and information stored on the consumer access device 124. While the specific details of the requested purchase to be transported to the acquirer server system 130 as part of the message requesting authorization of the pending transaction may be varied, the provided details should identify the total cost of the proposed purchase and, if the issuer server system 134 is to determine whether the proposed purchase complies with the restrictions on use of the consumer access device 124, each product (and/or type of product) included in the proposed purchase. Likewise, while the specific information stored in the consumer access device 124 to be transported to the acquirer server system 130 as part of the message requesting authorization of the pending transaction may be varied, the transported information should identify the food stamp recipient 122 and the consumer access device 124 used thereby in sufficient detail so that it may be associated with information, maintained by the issuer server system 134, regarding the food stamp recipient 122 and the consumer access device 124 issued thereto.

Continuing on to 216, the acquirer server system 130 passes the message requesting authorization of the pending transaction to the commercial payment processing network server system 132. As previously set forth, the commercial payment processing network server system 132 is responsible for (1) transporting messages requesting authorization of pending transactions received from plural acquirer server systems to an issuer server system operated by an issuer identified in the messages as having issued the consumer access devices being employed in the pending transactions; (2) transporting reply messages authorizing pending transactions from the issuer server system to the acquirer server systems originating the requests; (3) transporting reply messages rejecting pending transactions from the issuer server system to the acquirer server systems originating the requests and (4) for each authorized transaction, transferring funds in an amount equal to the amount specified in the corresponding request messages from the issuer server system to the acquirer server systems originating the requests. In this regard, it should be noted that the commercial payment processing network server system 132 exchanges messages and/or transfer funds between plural acquirer server systems (each of which is typically operated by a bank or other financial institution that handles funds on behalf of merchants retaining the services thereof) and plural issuer server systems (each of which is typically operated by a bank or other financial institution that issues consumer access devices) and that, to determine the destination of each received message and/or transfer of funds, the commercial payment processing network server system 132 examines the contents of each message and/or transfer received thereby.

At 218, the issuer server system 134 receives a message, transmitted by the commercial payment processing server system 132 requesting that the issuer server system 134 approve authorization of the pending purchase. As previously set forth, the message received by the issuer server system 134 requesting authorization of the proposed purchase contains an identification of the food stamp recipient 122, the amount of the purchase which is the subject of the pending transaction and, if appropriate, the good and/or type of goods to be purchased. From this information, the issuer server system 134 determines at 220 whether to authorize completion of the pending transaction in accordance with techniques to be more fully set forth below. Upon determining whether to authorize or decline the pending transaction at 220, the process continues to 222 where the issuer server system 134 transmits an authorization message to the POS system 126 via the commercial payment processing network server 132, the acquirer server system 130 and the merchant server system 128. As will be more fully described below, after receipt of the authorization message at 224, the pending transaction may be completed (if the authorization message indicates that the pending transaction should be completed, adjusted (if the authorization message indicates that the pending transaction should be declined but the food stamp recipient 122 indicates a willingness to adjust the pending transaction so that the adjusted transaction would be accepted) or terminated (if the authorization message indicates that the pending transaction should be declined and the food stamp recipient 122 is unwilling or unable to adjust the pending transaction so that the adjusted transaction would be accepted). Of course, the ability to adjust the pending transaction may be dependent on any number of other considerations, for example, whether the operator of the POS system 126 is aware that food stamps are being used to pay for the proposed transaction or whether the food stamp recipient 122 and/or the operator of the POS system 126 can be advised discreetly that the inclusion of prohibited goods is the cause of the transaction being declined.

Returning to 220, it is noted that, while it is fully contemplated that a variety of processes may be employed to determine whether the pending transaction should be completed, one such process is as follows. The issuer server system 134 first compares the type of goods that the food stamp recipient 122 seeks to purchase as part of the pending transaction to any restrictions on the benefits provided by the state agency 120 to the food stamp recipient 122 and previously associated, by the issuer, with the consumer access device 124 provided to the food stamp recipient 122. If the proposed transaction violates any of the restrictions associated with the benefits provided to the food stamp recipient 122, for example, if the benefit provided to the food stamp recipient 122 prohibits use of the funds provided thereunder to purchase alcoholic beverages and the message requesting authorization of the pending transaction indicates that the food stamp recipient 122 is seeking to purchase an alcoholic beverage, the issuer server system 134 generates an authorization message rejecting the pending transaction and transmits it to the POS system 126 via the commercial payment processing network server system 132, the acquirer server system 130 and the merchant server system 128. In turn, the POS system 126 generates a message, for example, by illuminating a display visible to the cashier and/or the food stamp recipient 122 indicating that the pending transaction had been declined, for example, by generating the statement "transaction declined" on a light emitting diode (LED) display. If desired, of course, the message rejecting the pending transaction may further provide the basis for declining the transaction had been declined and the LED display may further indicate the reason why the transaction had been declined, for example, by generating the statement "transaction declined—purchase includes alcoholic beverages."

Presuming that the goods contained in the pending transaction meet any restrictions as to the use of the benefit provided to the food stamp recipient 122 by the state agency or, in the alternative, if the benefit provided to the food stamp recipient 122 by the state agency 120 was of a nature that no restrictions were placed on the use thereof, the issuer server system 134 would compare the amount of the pending transaction, i.e., the cash value of the goods to be provided to the food stamp recipient 122 to the remaining benefit provided to the food stamp recipient 122 by the state agency 120. If the remaining benefit to be provided to the food stamp recipient 122 has a cash value that is equal to or exceeds the amount of the pending transaction, the issuer server system 134 generates an authorization message approving the pending transaction and transmits the authorization message to the commercial payment processing server system 132. In turn, the commercial payment processing server system 130 passes the authorization message to the acquirer server system 130 and on to the merchant server system 128 and the POS system 126. In this instance, however, the POS system 126 generates a message indicating that the pending transaction had been authorized, for example, by illuminating the LED display visible to the cashier and/or the food stamp recipient 122 with the statement "transaction approved."

To ensure that the food stamp recipient 122 is prevented from using the consumer access device 124 to obtain more benefits than the amount, provided thereto by the state agency 120, the issuer server system 134 must update the information related to the food stamp recipient 122 and the consumer access device 124 provided thereto after completion of a pending transaction. In this regard, it was previously set forth that, for each food stamp recipient 122 that the issuer 112 provides a consumer access device 124 thereto, the issuer 112 shall store an entry, in the memory subsystem of the issuer server system 134, describing the recipient (or the consumer access device provided thereto) and the benefits that the recipient is entitled. For example, the entry may provide the name of the food stamp recipient 122 (or an identification number associated with the food stamp recipient 122 or the consumer access device 124 provided thereto), the type of benefit provided (typically expressed as the type of goods and/or services to which the food stamp recipient 122 is entitled to purchase and the amount that the food stamp recipient 122 may spend purchasing the identified type of goods and/or services) and, if appropriate, a list of restrictions (if any) on use on the identified benefit. For example, the entry in the memory subsystem of the issuer server system 134 may indicate that "John Smith" is entitled to purchase (or, in the alternative, "consumer access device 124" may be used to purchase) up to $100 of food and non-alcoholic beverages. In a first, exemplary, use of the consumer access device 124, John Smith purchases $25 of food complying with the restriction that none of the purchased goods may be alcoholic beverages. Upon determining that the pending transaction is (1) a purchase of food and/or beverages (2) in compliance with the restriction that none of the beverages to be purchased may be comprised alcoholic beverages and (3) the cash value of the compliant goods that John Smith is entitled to purchase ($100) is equal to or greater than the cash value of the pending transaction ($25), the issue server system 134 would generate an authorization message approving the transaction. In addition, the issue server system 134 would reduce the amount that John Smith may spend purchasing additional amounts of compliant goods by the amount of the approved transaction, i.e., John Smith is now entitled to purchase $75 of compliant goods and/or services.

In one embodiment, it is contemplated that the consumer access device 124 may be produced by the issuer 112 to reflect multiple benefits provided by multiple sources, for example, food stamps provided by one state agency and unemployment benefits provided by a second state agency. By doing so, it is contemplated that a single disbursement process may be used to provide multiple benefits to a recipient, thereby resulting in considerable efficiencies in the distribution of benefits. Modification of the manner of producing the access card 124 is relatively straightforward. Each state agency employing the commercial payment processing system 100b to distribute benefits to recipients would simply identify each recipient of a benefit and the type, amount and restrictions (if any) on the benefit to be provided to the identified recipient. The issuer 112 would identify recipients of multiple benefits and generate a single consumer access device 124 containing all of the benefits to be provided to the recipient. If the type of benefits provided to the recipient and the restrictions imposed on the provided benefits are the same, the benefits may be readily combined. For example, if a federal agency provided a recipient with $100 of food stamps and a state agency provided the recipient with an additional $25 of foods stamps, the two benefits may be combined into a single entry which entitles the recipient to purchase $125 of food and/or non-alcoholic beverages and the value of approved transactions of compliant goods and/or services may be deducted from the value of the benefit provided to the recipient may proceed in the manner previously described. If the benefits differ, however, the issuer server system 134 would most likely need to segregate the benefits from one another and, for each message requesting authorization of a pending transaction, identify the benefit to be used to fund the pending transaction and issue approvals/rejections based upon the amount of funds associated with the identified benefit.

Returning now to 224, upon receiving the authorization message indicating that the pending transaction is approved, the cashier or other operator of the POS system 126 may now complete the transaction by formally turning possession of the goods over to the food stamp recipient 122. As the consumer access device 124 proffered by the food stamp recipient 122 is indistinguishable from a traditional credit card, at no point during the transaction was the food stamp recipient 122 identified as a recipient of government benefits. Further, while those instance in which the transaction was denied would be embarrassing to the food stamp recipient, the denial of a transaction initiated using the consumer access device 124 would most likely be presumed to be the result of the food stamp recipient 122 having exceeded their credit limit on their credit card and/or attempted a purchase subsequent to the credit issuer having temporarily suspended charging privileges, most commonly, for not making a timely payment on their account. While both of the foregoing would also be a source of embarrassment, such occurrences have happened to consumers of all economic statuses and, as a result, would not be necessarily be attributed to the food stamp recipient 122 receiving benefits from the government. Indeed, if discretion is of upmost concern, the commercial payment processing system 100b may be configured such that, in the event that the food stamp recipient 122 initiates a transaction using the consumer access device 124 that violates any restrictions imposed on the use of the benefits provided thereto or exceeds the remaining cash value of the provided benefit, the issuer server system 134 may simply decline to generate any reply message. If so, the commercial payment processing system 100b would simply "time out" after a predetermined time period has elapsed, a condition that would again result in the cashier or other operator of the POS system 126 declining to complete the transaction. Here, however, the assumption would be that the issuer server system 134 is off-line, a situation that is of no fault of the food stamp recipient 122.

As previously set forth, in one embodiment, it may be desirable that messages declining completion of a pending transaction as violating a restriction on the benefits provided to the food stamp recipient 122 be distinguishable from messages declining completion of a pending transaction as exceeding the remaining value of the benefit provided to the food stamp recipient 122. By doing so, the food stamp recipient 122 would have an opportunity to modify the proposed purchase in an appropriate manner which will insure approval of the transaction, for example, by removing the prohibited goods and/or one or more costly items from the proposed purchase. Once the prohibited goods and/or costly items are removed, the transaction may be resubmitted to the issuer server system 134 and subsequently approved (if all of the prohibited goods have been successfully removed from the pending transaction and/or the cost of the pending transaction has been reduced to a cost less than or equal to the remaining portion of the benefit provided to the food stamp recipient 122). By doing so, the need for the food stamp recipient 122 to either immediately find other financial resources to complete the pending transaction or to surrender the goods to the cashier and depart without purchasing any of the desired goods may be eliminated.

Of course, the order in which the issuer server system 134 checks whether (1) the cost of the pending transaction exceeds the remaining benefit to which the food stamp recipient 122 is entitled and (2) the proposed transaction violates restrictions placed on use of the benefit by the state agency 120 may be varied such that the comparison of the remaining benefit available to the food stamp recipient 122 with the cost of the pending transaction is performed prior to determining whether the pending transaction violation the restrictions on the benefits provided to the food stamp recipient 122 by the state agency 120. Similarly, while, in the disclosed embodiment, the issuer server system 134 checks the proposed transaction to determine if it violates any restrictions on the use of the benefit provided to the food stamp recipient 122 by the state agency 120, it should be noted that the check may occur elsewhere in the commercial payment processing system 100b. For example, it is contemplated that, in alternate embodiments thereof, the commercial payment processing network server system 132, the acquirer server system 130, the merchant server system 128 or the POS system 126 may determine whether the pending transaction violates any restrictions placed on the benefits provided to the food stamp recipient 122.

Generally, the closer to the POS system 126 that the compliance check is performed, the greater the reduction in traffic between the components of the commercial payment processing system 100b located behind the component performing the compliance check. In particular, if the compliance check were performed prior to transportation of the request messages to the issuer server system 134, the likelihood of a bottleneck developing between the commercial payment processing server system 132 and the issuer server system 134—the components of the commercial payment processing system 100b bearing the greatest load could be reduced. For example, if the commercial payment processing network server system 132 was responsible for determining if the proposed transaction violated restrictions placed on the use of the benefits provided to the food stamp recipient 122, the commercial payment processing server system 132 would be the most logical selection to generate the reply message indicating that the proposed transaction was declined. Accordingly, the issuer server system 134 would no longer need to receive those authorization requests containing violations of the restriction imposed on the benefits provided to the food stamp recipient 122 nor generate messages declining such authorization requests. Moreover, for the reduced number of authorization requests received thereby, the issuer server system 134 need only determine whether the cost of the pending transaction exceeds the remaining benefit to be provided to the food stamp recipient 122 and initiate the transfer of funds to the acquirer server system 130 in the event that the pending transaction is approved. In this manner, the processing demands on the issuer server system 134 would be reduced.

It should be recognized, however, that certain complications may result when the POS system 126, the merchant server system 128, the acquirer server system 130 or the commercial payment processing network server system 132 are made responsible for determining whether the pending transaction violates restrictions placed on the benefits provided to the food stamp recipient 122 and/or the use of the consumer access device 124 provided to the food stamp recipient 122. For one, the restrictions on the benefits provided to the food stamp recipient 122/use of the consumer access device 124 would need to be maintained in the memory subsystem of the POS or server system responsible for identifying violations. While the foregoing may not be a major hurdle when one set of restrictions, e.g., the restrictions imposed on the use of food stamps, are in place, the task becomes much more difficult when a single consumer access device is employed to provide multiple benefits. In such cases, the POS or server system would not only need to know the restrictions on each type of benefit but may need to be able to distinguish the types of benefits from one another and to associate each pending transaction with a provided benefit.

While a number of embodiments of a system and method of employing a commercial payment processing in a financial assistance program have been shown and described herein, modifications thereof may be made by one skilled in the art without departing from the spirit and the teachings of the invention. The embodiments described herein are exemplary only, and are not intended to be limiting. Many variations, combinations, and modifications of the embodiments disclosed herein are possible and are within the scope of the teachings set forth herein. Accordingly, the scope of protection is not limited by the description set out above but is only defined by the claims appended hereto.

The invention claimed is:

1. A restricted use account transaction processor-implemented method for a government sponsored financial assistance program including at least two different government agencies, wherein each of the at least two different government agencies provides a plurality of benefits to a cardholder, the method comprising:
  receiving, at a payment processing network server system, a payment transaction request from a merchant server for a purchase transaction upon engagement of a consumer portable device having a restricted use account, wherein the payment processing network server system is in communication via a shared network with an issuer server system and the merchant server system, the consumer portable device carrying information including:
    identifying information of the cardholder of the consumer portable device; and
    a pre-deposited amount associated with the consumer portable device; generating, by at least one processor of the merchant server system, an issuer authorization request for the purchase transaction based on the received payment transaction request;
  transmitting the generated issuer authorization request to the issuer server system, wherein the issuer server system includes a processor and a memory subsystem that stores an entry identifying the cardholder, the plurality of benefits of the cardholder being provided by the at least two different government agencies, and a list of restrictions on each of the benefits;
  processing, by the issuer server system processor, the generated issuer authorization request to identify a particular one of the benefits to be used to fund the purchase transaction and determining that at least one item associated with the payment transaction request violates at least one of the restrictions for the particular benefit by comparing the at least one item to the list of restrictions for the particular benefit;
  in response to a violation determination, generating, by the issuer server system processor, a distinguishable transaction suspension response message based on the violation; and,
  sending the distinguishable transaction suspension response message from the issuer server system to the merchant server system, said distinguishable transaction suspension response including indicia of a reason for suspending the purchase transaction, and required adjustments of a purchase item included in the purchase transaction based on the at least one of the restrictions; and
  conditionally resuming the purchase transaction via the merchant server system upon fulfillment of said required adjustments.

2. The method of claim 1, wherein the consumer portable device comprises a prepaid card.

3. The method of claim 1, wherein the at least one of the benefits is a food stamp.

4. The method of claim 1, wherein the list of restrictions specify allowable usage of the consumer portable device.

5. The method of claim 1, wherein the consumer portable device has a name of the cardholder imprinted thereon.

6. The method of claim 1, wherein the consumer portable device has a payment processing network name imprinted thereon.

7. The method of claim 1, wherein the pre-deposited amount is deposited by an issuer, and said issuer is reimbursed by a restricted account sponsor.

8. A restricted use account transaction system for a government sponsored financial assistance program including at least two different government agencies, wherein each of the at least two different government agencies provides a plurality of benefits to a cardholder, the system comprising:
  a payment processing network server system having:
    a memory; and
    a processor disposed in communication with said memory, and configured to issue a plurality of processing instructions stored in the memory, wherein the processor issues instructions to:
      receive a payment transaction request for a purchase transaction upon instantiation of a consumer portable device having a restricted use account, the consumer portable device carrying information including:
        identifying information of a cardholder of the consumer portable device; and
        a pre-deposited amount associated with the consumer portable device;
      generate an issuer authorization request for the purchase transaction based on the received payment transaction request;
      transmit the generated issuer authorization request to an issuer server system, wherein the issuer server system includes a processor and a memory subsystem that stores an entry identifying the cardholder, the plurality of benefits of the cardholder being provided by the at least two different government agencies, and a list of restrictions on each of the benefits, wherein the issuer server system processor:
        processes the generated issuer authorization request to identify a particular one of the benefits to be used to fund the purchase transaction,
        determines that at least one item associated with the payment transaction request violates at least one of the restrictions for the particular benefit by comparing the at least one item to the list of restrictions for the particular benefit, and in response to a violation, generates a distinguishable transaction suspension response message based on the violation;

send the distinguishable transaction suspension response message from the issuer server system, said distinguishable transaction suspension response message including indicia of a reason for suspending the purchase transaction, and required adjustments of a purchase item included in the purchase transaction based on the at least one of the restrictions; and conditionally resume the purchase transaction upon fulfillment of said required adjustments.

9. The system of claim 8, wherein the consumer portable device comprises a prepaid card.

10. The system of claim 8, wherein at least one of the benefits is a food stamp.

11. The system of claim 8, wherein the list of restrictions specify allowable usage of the consumer portable device.

12. The system of claim 8, wherein the consumer portable device has a name of the cardholder imprinted thereon.

13. The system of claim 8, wherein the consumer portable device has a payment processing network name imprinted thereon.

14. The system of claim 8, wherein the pre-deposited amount is deposited by an issuer, and said issuer is reimbursed by a restricted account sponsor.

15. A restricted use account transaction processor-implemented method for a government sponsored financial assistance program including at least two different government agencies, wherein each of the at least two different government agencies provides a plurality of benefits to a cardholder, the method comprising:

receiving a payment transaction request for a purchase transaction subsequent to engagement of a consumer portable device, wherein the request comprises:

identifying information of a cardholder of the consumer portable device, each product or type of product associated with the purchase transaction, and a total cost of the purchase transaction;

generating, by at least one processor, an issuer authorization request for the purchase transaction based on the received payment transaction request;

transmitting the generated issuer authorization request to an issuer server system, wherein the issuer server system includes a processor and a memory subsystem that stores an entry identifying the cardholder, the plurality of benefits of the cardholder being provided by the at least two different government agencies, and a list of restrictions on each of the benefits;

processing, by the issuer server system processor, the generated issuer authorization request to identify a particular one of the benefits to be used to fund the purchase transaction and determining that at least one item associated with the payment transaction request violates at least one of the restrictions for the particular benefit by comparing the at least one item to the list of restrictions for the particular benefit;

generating, by the issuer server system processor, a distinguishable transaction suspension response message based on the violation;

sending the distinguishable transaction suspension response message from the issuer server system, said distinguishable transaction suspension response message including indicia of a reason for suspending the purchase transaction, and required adjustments of a purchase item included in the purchase transaction based on the at least one of the restrictions; and conditionally resuming the purchase transaction upon fulfillment of said required adjustments.

16. The method of claim 15, wherein the consumer portable device is a prepaid card.

17. The method of claim 15, wherein the consumer portable device is associated with a restricted use account issued by an issuer, and allowable usage of the restricted use account is determined by the issuer.

18. The method of claim 17, further comprising depositing a predetermined amount in the restricted use account.

* * * * *